United States Patent
Breuer et al.

(10) Patent No.: US 7,920,859 B2
(45) Date of Patent: Apr. 5, 2011

(54) METHOD OF CONTROLLING RECEIPT OF SIGNALS AT A TERMINAL OF A COMMUNICATIONS SYSTEM

(75) Inventors: Volker Breuer, Boetzow (DE); Nobert Kroth, Potsdam (DE); Toby Kier Proctor, Salisbury Wiltshire (GB); David Randall, Romsey Hampshire (GB)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 709 days.

(21) Appl. No.: 11/667,453

(22) PCT Filed: Oct. 10, 2005

(86) PCT No.: PCT/GB2005/003884
§ 371 (c)(1),
(2), (4) Date: Feb. 26, 2008

(87) PCT Pub. No.: WO2006/051253
PCT Pub. Date: May 18, 2006

(65) Prior Publication Data
US 2009/0023438 A1 Jan. 22, 2009

(30) Foreign Application Priority Data
Nov. 10, 2004 (GB) .................................. 0424806.8

(51) Int. Cl.
*H04W 24/00* (2009.01)
(52) U.S. Cl. ..................................... 455/423; 455/422.1
(58) Field of Classification Search .................... None
See application file for complete search history.

(56) References Cited

U.S. PATENT DOCUMENTS

| 4,656,619 A * | 4/1987 | Hotta et al. ................... 370/217 |
| 2005/0083898 A1 * | 4/2005 | Ohwada ....................... 370/342 |
| 2005/0164677 A1 * | 7/2005 | Tsutsui ........................ 455/411 |
| 2006/0212247 A1 * | 9/2006 | Shimoyama et al. ........... 702/89 |

FOREIGN PATENT DOCUMENTS

| WO | WO 97/15169 | 4/1997 |
| WO | WO 99/21390 | 4/1999 |

OTHER PUBLICATIONS

UK Patent Office Search Report issued in corresponding British Patent Application No. 0424806.8.
Ericsson, 3GPP TSG-RAN WG4 #32, R4-040437, Aug. 16-20, 2004; p. 1, paragraph 1, p. 2, paragraph 2.2.1-p. 4, paragraph 2.2.2, p. 6 paragraph 5.2.3-p. 7 paragraph 5.2.3 fig. 1,3.

(Continued)

*Primary Examiner* — Ajit Patel
(74) *Attorney, Agent, or Firm* — Staas & Halsey LLP

(57) ABSTRACT

A method of controlling receipt of signals at a terminal (1) of communications system involves receiving data (D1,D2) on at least one control channel from a first base station (2). The terminal is adapted to periodically perform measurements on signals transmitted by at least one second base station (3,4). The terminal determines whether a period in which data signals (D2) are on the at least on control channel at least partially overlaps with a period for performing measurements (M2) and disables performance of measurements in favor of receipt of data on the at least one control channel.

10 Claims, 1 Drawing Sheet

OTHER PUBLICATIONS

Figure 1:
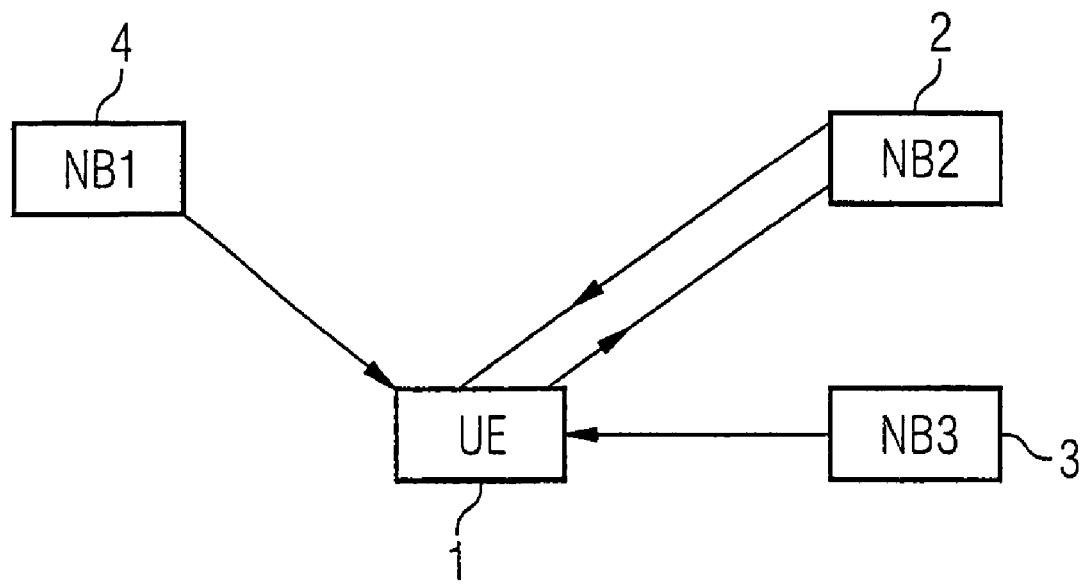

Siemens, 3GPP TSG-RAN WG4 #32, R4-040413, Aug. 16-20, 2004, p. 1 paragraph 1-p. 4 paragraph 2.4.

Siemens, 3GPP TSG-RAN WG2 #45, R2-042485, Nov. 15-19, 2004; p. 1 paragraph 1-p. 1 paragraph 3.1. page 2 paragraph 4.

"Universal Mobile Telecommunications System (UMTS); Introduction of Multimedia Broadcast/Multicast Service (MBMS) in the Radio Access Network (RAN); Stage 2 (3GPP TS 25.346 version 6.2.0 Release 6); ETSI TS 125 346" ETSI Standards, European Telecommunications Standards Institute, Sophia-Antipo, FR, vol. 3-R, No. V620, Sep. 2004, XP014016839 p. 13 paragraph 5.2.3, p. 25 paragraph 7.3.4 p. 40 paragraph 10.2-p. 41 paragraph 10.2 p. 42 paragraph 10.2.4 fig. 5.2.3.

3GPP TR 25.992, V1.2.0 (Jan. 2003), Multimedia Broadcast Multicast Service (MBMS); UTRAN/GERAN Requirements, published Jan. 2003.

3GPP TR 23.846, V6.1.0 (Dec. 2002), MBMS; Architecture and functional description (Release 6), published Jan. 2003.

3GPP TS 22.146, V6.6.0 (Sep. 2004) MBMS; Stage 1 (Release 6), published Oct. 2004.

3GPP TS 45.002, V6.6.0 (Apr. 2004) Multiplexing and multiple access on the radio path (Release 6), published May 2004.

* cited by examiner

METHOD OF CONTROLLING RECEIPT OF SIGNALS AT A TERMINAL OF A COMMUNICATIONS SYSTEM

CROSS REFERENCE TO RELATED APPLICATIONS

This application is based on and hereby claims priority to PCT Application No. PCT/GB2005/003884 filed on Oct. 10, 2005 and British Application No. 0424806.8 filed on Nov. 10, 2004, the contents of which are hereby incorporated by reference.

BACKGROUND

The invention relates to a method of controlling receipt of signals at a terminal of a communications system, in particular for a mobile radio communications system.

In radio communications systems, signals are exchanged between radio terminals and radio stations to base stations via a so called radio interface or air interface. Such radio terminals are mobile or stationary user terminals or user equipments (UE). The base stations or Node Bs are access stations that are associated with a land based communication network. Examples of known radio communication systems are second generation digital mobile radio communication systems such as global system for mobile communication (GSM), based on time division multiple access (TDMA) and providing data rates up to 100 kbit/s, or third generation digital mobile radio communication systems such as universal mobile telecommunication system (UMTS), based on code division multiple access (CDMA) with data rates up to 2 Mbit/s.

A new feature in current radio communication systems such as GSM, GSM edge radio access network (GERAN) and UMTS, UMTS terrestrial radio access network (UTRAN) is the provision of multimedia broadcast multicast service (MBMS). Radio bearers for multicast MBMS services are set up within a cell of a base station, if there are user equipments present in the cell with the particular MBMS service activated. One of the main differences between MBMS and previous services is that MBMS can be offered and used when the user equipment is in idle mode, i.e. without an established radio connection to the network. The service uses a point-to-multipoint connection, either in a multicast or broadcast mode. General principles of MBMS are described in the standard documents 3GPP TR 25.992, V1.2.0 (2003-01) "Multimedia Broad-cast Multicast Service (MBMS); UTRAN/GERAN Requirements", TR 23.846, V6.1.0 (2003-01) "MBMS; Architecture and functional description (Release 6)", TS 22.146, V6.6.0 (2004-10) "MBMS; Stage 1 (Release 6)" and TS 45.002, V6.6.0 (2004-05) "Multiplexing and multiple access on the radio path (Release 6).

With the introduction of MBMS in UTRAN, a significant amount of control information related to the MBMS configuration in the cell of a base station is provided on an MBMS control channel (MCCH). A UE is required to periodically read this MCCH based upon the provision of services in the cell for which the UE is registered. The information scheduling and further parameters of the MCCH are described in detail in the standard document 3GPP TS 25.346 V6.2.0 (2004-09), chapter 5.2.

However, existing UE behaviour specifies that a UE is required to periodically make measurements of the neighbour cells in order for a UE to choose the cell in which it should operate. These measurements require the UE to measure channels provided in other cells, but a single receiver UE is unable to measure these channels and listen in its own cells at the same time.

This problem is exacerbated if the period over which the MCCH is repeated is a multiple of the frequency of occurrence of the occasions when the UE is required to perform neighbour cell measurements.

Information provided on the MCCH is repeated over a period of time known as the modification period, as defined in the above TS 25.346. This time interval defines the period over which one static set of MCCH information is provided to the UE. Some information used for notification purposes may change over this period, but this is not significant. Information within a modification period is repeated a plurality of times, each repetition being known as a repetition period. Each modification period is an exact multiple of a repetition period.

At the start of each modification period an index is sent which contains information about which services ongoing in the cell have had some configuration parameters changed since the last modification period and which have remained the same. This index is sent in order to reduce the amount of time the UE is required to read MCCH each modification period. If the index is not correctly read, the UE must read the whole of MCCH until it has successfully read all information.

Therefore, a method for efficiently establishing new connections in situations described above is required.

Ericsson: "Measurement requirements and MBMS reception"; 3GPP TSG-RAN WG4 #32, R4-040437; 16-20 Aug. 2004; pages 1 to 11; XP002362097 describes the existence of the problem of the conflict between inter-frequency and inter-RAT measurement with MBMS decoding during MBMS sessions.

Siemens: "Measurement requirements and MBMS reception in Cell-FACH state"; 3GPP TSG RAN WG4 #32, R4-040413; 18-20 Aug. 2004; pages 1 to 5; XP002362098 describes a plurality of options for dealing with the impact of MBMS data loss on MBMS quality of service.

SUMMARY

The inventors purpose a method of controlling receipt of signals at a terminal of a communications system comprises receiving data on at least one control channel from a first base station; wherein the at least one control channel is associated with a multimedia broadcast multicast service (MBMS) channel; wherein the terminal is adapted to periodically perform measurements on signals transmitted by at least one second base station; wherein the terminal determines whether a period in which data signals are on the at least one control channel at least partially overlaps with a period for performing measurements; and, if there is an overlap, the terminal disables performance of measurements in favour of receipt of data on the at least one control channel.

Conventionally, measurements of neighbour cells take absolute priority, however the proposed method makes use of the fact that a sufficiently good quality set of measurements can be obtained in fewer measurement periods than those specified, so rather than delay a measurement when there is a conflict between receiving control data and taking the measurements, as proposed in some related art systems, the proposed method simply discards taking measurements in that particular measurement period and uses only the measurements obtained in other periods, whilst giving priority in the circumstances to receipt of control data in that period. This improves overall efficiency of the system.

Preferably, the data on the at least one control channel is repeated periodically.

Preferably, the data on the at least one control channel relates to changes in the configuration of the associated MBMS channel.

Preferably, performance of measurements is disabled until all data on the changes has been received by the terminal.

The inventors also propose a terminal for a communication system comprises a receiver to receive data on at least one control channel from a first base station; wherein the at least one control channel is associated with a multimedia broadcast multicast service (MBMS) channel; a measurement unit to periodically performing measurements on signals transmitted by at least one second base station; a processor for determining whether a period in which data signals are on the at least one control channel at least partially overlaps with a period for performing measurements, and a disabling unit to disabling performance of measurements in favour of the receipt of data on the at least one control channel, if there is an overlap.

The terminal could be a static terminal, but preferably the terminal is a mobile terminal.

In accordance with a third aspect of the present invention a communication system comprises at least one base station and at least one terminal, for carrying out a method according to the first aspect.

Preferably the at least one terminal is a mobile terminal according to the second aspect.

BRIEF DESCRIPTIONS OF THE DRAWINGS

Figure 2:
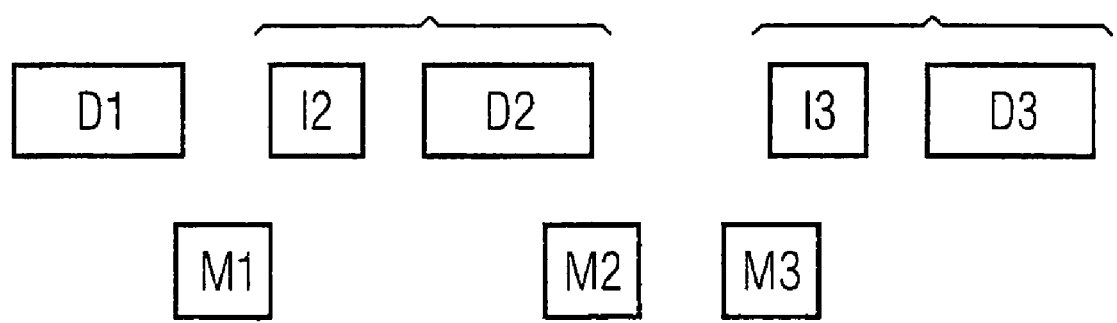

These and other objects and advantages of the present invention will become more apparent and more readily appreciated from the following description of the preferred embodiments, taken in conjunction with the accompanying drawings of which:

FIG. 1 shows a block diagram of a radio communication network according to one possible embodiment of the present invention; and FIG. 2 illustrates relative occurrence of control channel data and measurement time periods for applying the proposed method.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

FIG. 1 shows a typical arrangement whereby a terminal 1 sends data to a base station 2 and receives signalling from the base station on the MBMS control channel (MCCH). At various times, the terminal 1 must take measurements of neighbour cells 3 and 4.

As shown in FIG. 2, there can be conflict if a time period in which data is being transmitted on the MCCH overlaps or coincides with a time period in which a measurement of the neighbour cells is to be made.

Initially, a data block D1 is transmitted and a measurement period M1 occurs after this. Next, an index I2 is sent, followed by the next data block D2. A second measurement period M2 is allocated immediately followed by a third measurement period M3. However, M3 overlaps with the next MCCH period, beginning with index I3. Therefore, the terminal 1 reads the index and if the index I3 indicates that there is information of relevance to the terminal, then reading of D3 takes precedence over the measurement of neighbour cells.

Thus, for any occasion when the UE detects that a measurement period and an MCCH modification period boundary or repetition period occur at the same time, the UE initially gives priority to reading the MCCH until the UE has successfully read the index.

If a UE has read the index for this modification period and this indicates that there is nothing for the UE to read in this MCCH modification period, the UE continues with the measurement periods as currently specified. If the UE reads the index for this modification period, and the index indicates that there is information of relevance to the UE, then the UE gives priority to reading the MCCH, rather than to the coinciding measurement occasions until the UE has successfully read the MCCH block which carries the relevant service information. Thereafter, the UE proceeds with the measurement periods as specified.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method of controlling receipt of signals at a terminal of a communications system, the method comprising:
   receiving data on a control channel from a first base station;
   periodically performing measurements at the terminal on signals transmitted by a second base station, the control channel being associated with a multimedia broadcast multicast service channel;
   determining at the terminal whether a period in which data signals are transmitted on the channel overlaps with a period in which measurements are performed; and
   disabling performance of the measurements in favor of receipt of the data signals on the control channel, the measurements being disabled if there is an overlap.

2. The method according to claim 1, wherein the data on the at least one control channel is repeated periodically.

3. The method according to claim 1, wherein the data on the at least one control channel relates to changes in the configuration of the associated MBMS channel.

4. The method according to claim 3, wherein performance of measurements is disabled until all data on the changes has been received by the terminal.

5. The method according to claim 2, wherein the data on the at least one control channel relates to changes in the configuration of the associated MBMS channel.

6. The method according to claim 5 wherein performance of measurements is disabled until all data on the changes has been received by the terminal.

7. A terminal for a communication system, the terminal comprising:
   a receiver to receive data signals on a control channel, the data signals being transmitted from a first base station, the control channel being associated with a multimedia broadcast multicast service channel;
   a measurement unit to periodically perform measurements on signals transmitted by a second base station; and
   a processor to determine whether transmission of the data signals by the first base station overlaps with performance of the measurements, and to disable performance of the measurements in favor of receipt of the data signals if there is an overlap.

8. The terminal according to claim 7, wherein the terminal is a mobile terminal.

9. A communication system, comprising:

a first base station to transmit data signals on a control channel; and a terminal comprising:

a receiver to receive data signals on the control channel from the first base station, the control channel being associated with a multimedia broadcast multicast service channel;

a measurement unit to periodically perform measurements on signals transmitted by a second base station; and a processor to determine whether transmission of the data signals by the first base station overlaps with performance of the measurements, and to disable performance of the measurements in favor of receipt of the data signals if there is an overlap.

10. The communication system according to claim 9 wherein the terminal is a mobile terminal.

* * * * *